United States Patent
Andreani

(10) Patent No.: US 11,292,571 B2
(45) Date of Patent: Apr. 5, 2022

(54) DOOR ARRANGEMENT FOR AN AIRCRAFT SEGMENT

(71) Applicant: Airbus Operations GmbH, Hamburg (DE)

(72) Inventor: Luc Andreani, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 128 days.

(21) Appl. No.: 16/774,716

(22) Filed: Jan. 28, 2020

(65) Prior Publication Data

US 2020/0239119 A1 Jul. 30, 2020

(30) Foreign Application Priority Data

Jan. 30, 2019 (DE) .......................... 102019102263.0
Jan. 30, 2019 (DE) .......................... 102019102267.3

(51) Int. Cl.
*B64C 1/14* (2006.01)
*E05B 77/00* (2014.01)
*B64D 25/14* (2006.01)

(52) U.S. Cl.
CPC ............ *B64C 1/1423* (2013.01); *E05B 77/00* (2013.01); *B64D 25/14* (2013.01)

(58) Field of Classification Search
CPC ............................... B64C 1/1423; B64C 25/14
See application file for complete search history.

(56) References Cited

U.S. PATENT DOCUMENTS 4,125,235 A * 11/1978 Fitzgerald ............... B64C 1/143
    244/129.5
4,512,539 A * 4/1985 Ackermann .......... B64C 1/1407
    244/137.2
8,061,658 B2 11/2011 Bullesbach
(Continued)

FOREIGN PATENT DOCUMENTS

DE      2029167 A    12/1971
DE   102007034471 B4    1/2009
(Continued)

OTHER PUBLICATIONS

German Search Report from German Patent Application No. 102019102263.0; priority document.
(Continued)

*Primary Examiner* — Philip J Bonzell
*Assistant Examiner* — Tye William Abell
(74) *Attorney, Agent, or Firm* — Greer, Burns & Crain, Ltd.

(57) ABSTRACT

A door arrangement for an aircraft segment, which door arrangement comprises a passenger door, a fuselage portion accommodating the passenger door, and a girt bar for arming and disarming an emergency slide. The passenger door is movable relative to the fuselage portion between a raised position and a lowered position. The girt bar is connectable by means of a connecting arrangement to the passenger door and/or to the fuselage portion. The connecting arrangement comprises a mechanism which is configured to, during arming of the emergency slide, actuate a locking mechanism of an engagement device fastened to the fuselage portion, in such a way that the girt bar is fixed in a decouplable manner to the engagement device.

13 Claims, 5 Drawing Sheets

Door raised
- armed -

(56) References Cited

U.S. PATENT DOCUMENTS

| | | | |
|---|---|---|---|
| 10,358,225 B2 | 7/2019 | Minchau et al. | |
| 2009/0020648 A1* | 1/2009 | Bullesbach | B64D 25/14 244/137.2 |
| 2015/0034769 A1* | 2/2015 | Minchau | B64D 25/14 244/137.2 |

FOREIGN PATENT DOCUMENTS

| | | |
|---|---|---|
| DE | 102008032225 A1 | 1/2010 |
| WO | 2013132282 A1 | 9/2013 |

OTHER PUBLICATIONS

German Search Report from German Patent Application No. 102019102267.3; priority document.

* cited by examiner

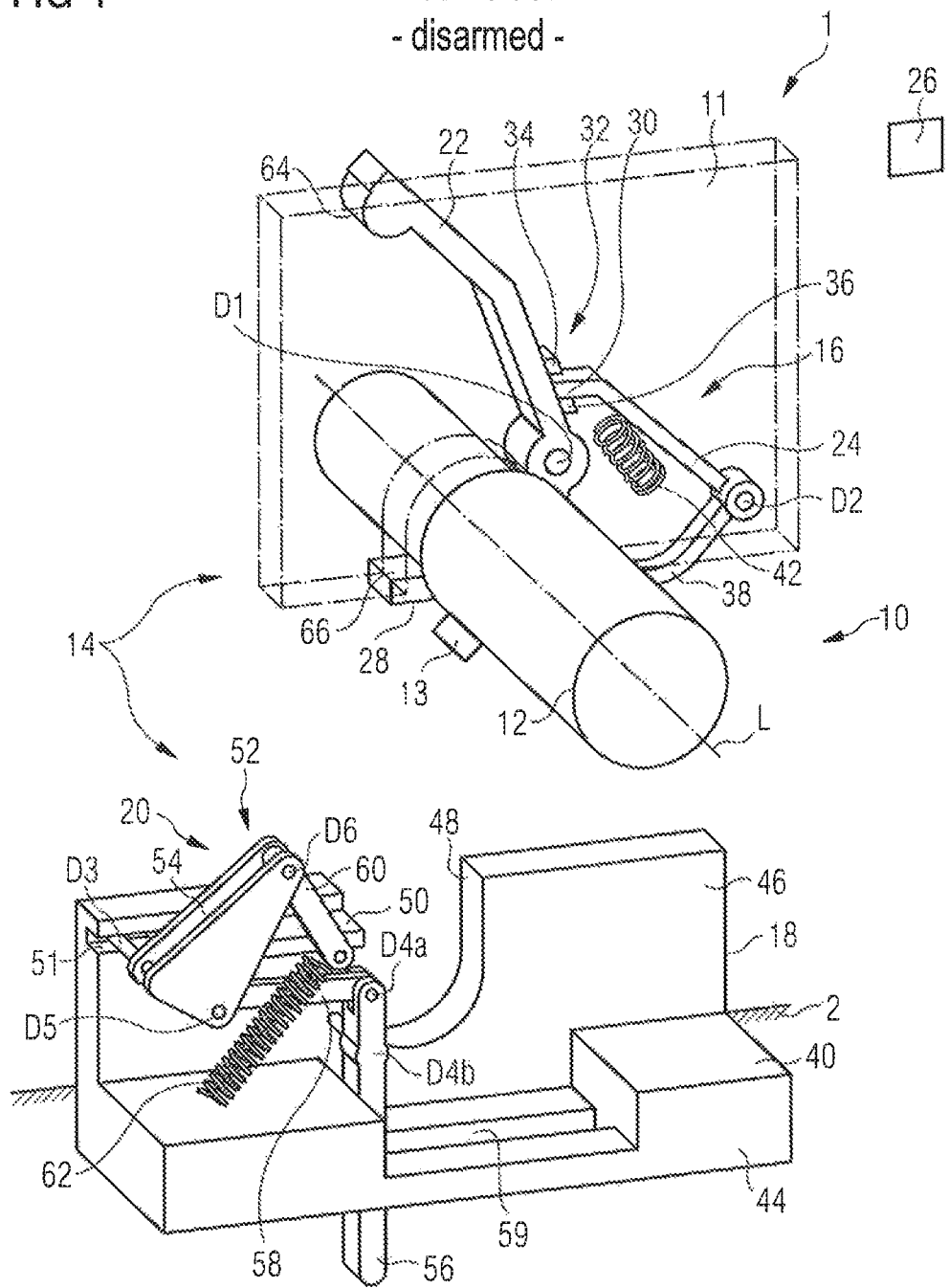

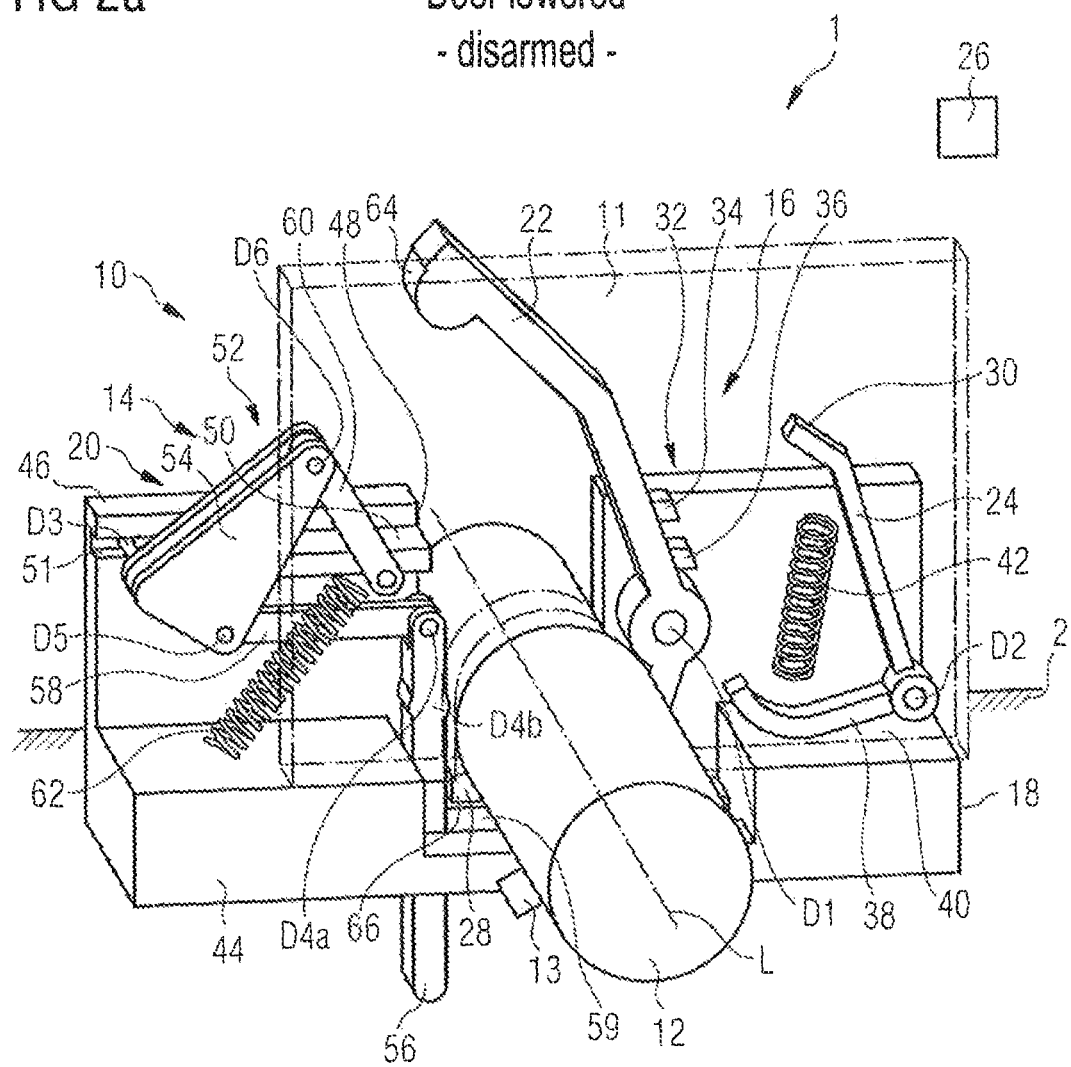

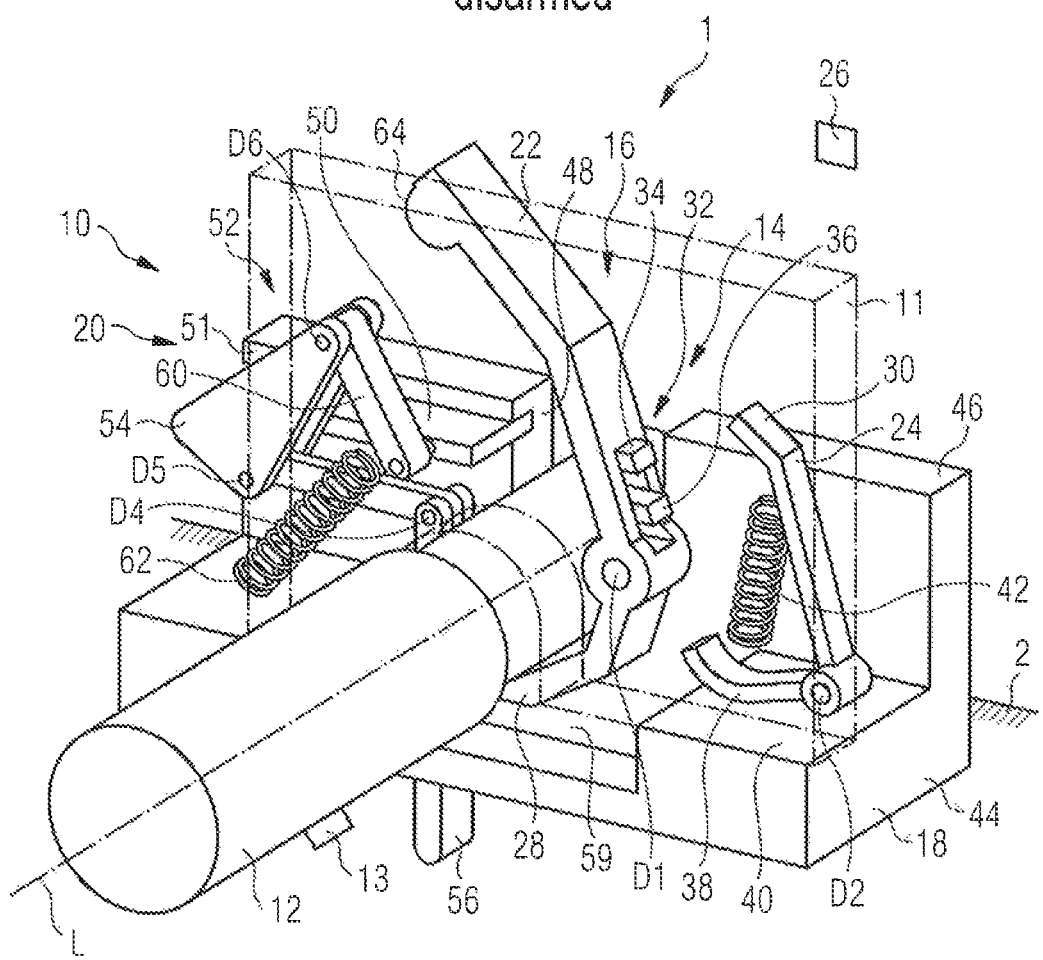
FIG 2b  Door lowered
- disarmed -

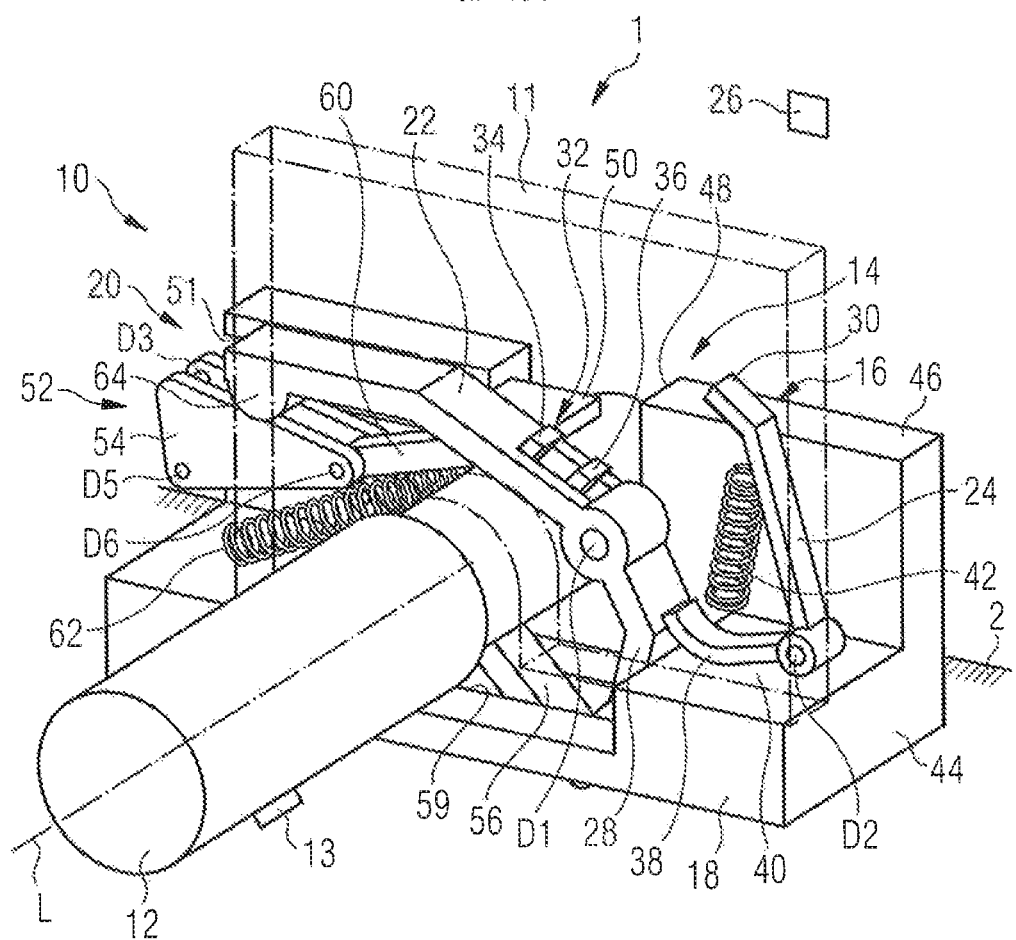

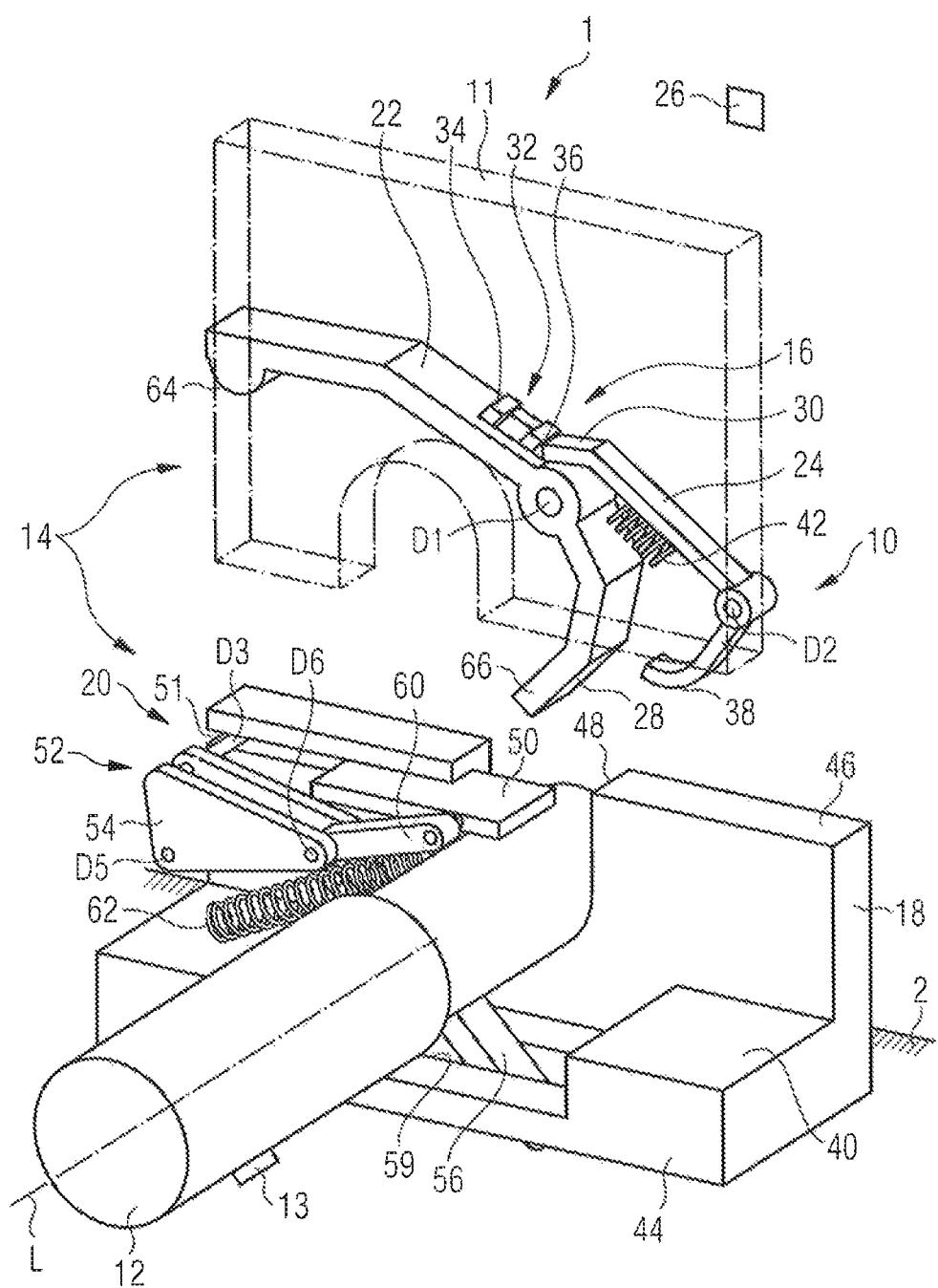
FIG 4   Door raised
        - armed -

DOOR ARRANGEMENT FOR AN AIRCRAFT SEGMENT

CROSS-REFERENCES TO RELATED APPLICATIONS

This application claims the benefit of the German patent application No. 102019102263.0 filed on Jan. 30, 2019, and of the German patent application No. 102019102267.3 filed on Jan. 30, 2019, the entire disclosures of which are incorporated herein by way of reference.

FIELD OF THE INVENTION

The present invention relates to a door arrangement for an aircraft segment. The invention furthermore relates to an aircraft segment equipped with a door arrangement of this type.

BACKGROUND OF THE INVENTION

A door arrangement used in any modern transport aircraft is commonly equipped with an emergency slide kinematic system which comprises a girt bar, an emergency slide connected to the girt bar, and a selector lever provided in the region of an inner side of the passenger door. When the passenger door is open and when the passenger door is closed in the disarmed state of the emergency slide, the girt bar is fastened to the passenger door. The arming of the emergency slide is performed by means of a manual actuation of the selector lever mechanism in the closed state of the passenger door. The arming of the emergency slide induces a movement of the girt bar, as a result of which the girt bar enters into engagement with an engagement device provided in the region of a fuselage portion which accommodates the passenger door and which is designed, for example, in the form of a door frame portion, of the transport aircraft. If the passenger door is then opened in an emergency situation, the girt bar decouples from the passenger door as a result of the lifting movement of the passenger door. At the same time, the girt bar is locked in its position in the engagement device. As a result, the emergency slide is attached, so as to be ready for use, to the aircraft structure.

SUMMARY OF THE INVENTION

The present invention is directed to an object of specifying a door arrangement for an aircraft segment, and an aircraft segment, which are equipped with an emergency slide kinematic system which is of simple design and is reliable.

A door arrangement for an aircraft segment comprises a passenger door and a fuselage portion accommodating the passenger door. The passenger door is movable relative to the fuselage portion, which accommodates the passenger door, between a raised position and a lowered position. The fuselage portion may be designed, for example, in the form of a door frame and have a door opening that accommodates the passenger door. Furthermore, the door arrangement comprises a girt bar for arming and disarming an emergency slide. The girt bar is connectable by means of a connecting arrangement to the passenger door and/or to the fuselage portion. Accordingly, an emergency slide connected to the girt bar can be selectively connected to the passenger door and/or to the fuselage portion by means of the connecting arrangement.

The connecting arrangement comprises a mechanism which is configured to, during arming of the emergency slide, actuate a locking mechanism of an engagement device fastened to the fuselage portion, in such a way that the girt bar is fixed in a decouplable manner to the engagement device. By means of the interaction of the mechanism of the connecting arrangement with the locking mechanism of the engagement device, the girt bar is thus fixed to the engagement device immediately during the arming of the emergency slide.

Thus, in the case of the door arrangement described here, the emergency slide is securely connected to the fuselage portion already in the armed state, and an additional locking step that first takes place during the activation of the emergency slide is avoided. Furthermore, the mechanism for actuating the locking mechanism of the engagement device is integrated into the connecting arrangement. The door arrangement is accordingly distinguished by an emergency slide kinematic system which is of simple design and small construction and which is reliable.

The mechanism of the connecting arrangement is preferably configured to connect the girt bar to the passenger door in the disarmed state of the emergency slide. In this way, an inadvertent triggering of the emergency slide during the opening of the passenger door is reliably prevented. In addition or alternatively, the engagement device of the connecting device may be configured to connect the girt bar to the fuselage portion in the armed state of the emergency slide. It is thereby ensured that, in an emergency situation, the emergency slide is securely connected to the fuselage portion and is operational without limitation.

The mechanism of the connecting arrangement is preferably furthermore configured to, during disarming of the emergency slide, that is to say, during a transfer of the emergency slide from its armed state into its disarmed state, actuate the locking mechanism of the engagement device fastened to the fuselage portion, in such a way that the locking mechanism is unlocked. By means of the unlocking of the locking mechanism, the decoupling of the girt bar from the engagement device is possible, such that the girt bar can be decoupled from the fuselage portion and connected to the passenger door again. It is thus also the case for the unlocking of the locking mechanism that no separate unlocking step and no separate mechanism are required—rather, the unlocking of the locking mechanism takes place automatically during the course of the disarming of the emergency slide.

The connecting arrangement is preferably furthermore configured to, during the arming of the emergency slide, hold the girt bar positionally fixed relative to the passenger door situated in its lowered position. In other words, in the case of the passenger door arrangement, it is preferably the case that the position of the girt bar relative to the passenger door is not changed during the transition from disarming to arming of the emergency slide in the lowered state of the passenger door. In this way, a complex interface between passenger door, girt bar and fuselage portion, which can lead to difficult or complex handling and also interruptions during production and maintenance, is avoided. In particular, it is possible to dispense with a complex kinematic system owing to the transfer of the girt bar between the passenger door and the fuselage portion. The emergency slide securing system of the door arrangement can then be designed to be particularly lightweight, simple and robust with regard to handling and tolerances.

The mechanism preferably comprises a holding element. The holding element may be fastened to the passenger door.

The holding element is, in particular, rotatable about a first rotary axle relative to the passenger door between a holding position and a release position. For example, the holding element may be configured to be transferred from its holding position into its release position by means of an anticlockwise rotation about the first rotary axle. In its holding position, the holding element is preferably configured to connect the girt bar to the passenger door. Accordingly, in the disarmed state of the emergency slide, the holding element is preferably situated in its holding position and in engagement with the girt bar. In this way, the girt bar is securely fixed to the passenger door in the disarmed state of the emergency slide. By contrast, in its release position, the holding element is preferably configured to release the girt bar. Accordingly, during the arming of the emergency slide, the holding element is preferably rotated about the first rotary axle from its holding position into its release position. In this way, the girt bar is released and decoupled from the passenger door.

The holding element may, for example, be designed in the form of a lever with lever arms extending from the first rotary axle. In the region of a first end, the holding element preferably comprises a receiving portion which is configured to receive the girt bar, and hold the latter in its position relative to the passenger door, when the holding element is situated in its holding position in the disarmed state of the emergency slide. The receiving portion may be designed, for example, in the form of a curved lever arm and positioned so as to engage under the girt bar when the holding element is situated in its holding position.

Furthermore, the holding element may be equipped, in the region of a second end, with a first actuation portion which is configured to actuate the locking mechanism of the engagement device such that the girt bar is fixed in a decouplable manner to the engagement device when the holding element is rotated about the first rotary axle relative to the passenger door from its holding position into its release position during the arming of the emergency slide. The first actuation portion may, for example, be configured to come into contact with the locking mechanism of the engagement device and subject the locking mechanism to a pressure force, which locks the locking mechanism, when the holding element is transferred from its holding position into its release position by means of an anticlockwise rotation about the first rotary axle.

The receiving portion of the holding element may comprise a second actuation portion which is configured to actuate the locking mechanism of the engagement device such that the locking mechanism is unlocked when the holding element is rotated about the first rotary axle relative to the passenger door from its release position into its holding position during the disarming of the emergency slide. The second actuation portion may be arranged directly in the region of the first end of the holding element. In particular, the second actuation portion may be configured to come into contact with the locking mechanism of the engagement device and subject the locking mechanism to a pressure force, which unlocks the locking mechanism, when the holding element is transferred from its release position into its holding position by means of a clockwise rotation about the first rotary axle.

The mechanism preferably also comprises an arresting element. The arresting element may be fastened to the passenger door, adjacently with respect to the holding element. The arresting element is, in particular, rotatable about a second rotary axle relative to the passenger door between a decoupled position and an arresting position. The second rotary axle of the arresting element extends preferably substantially parallel to the first rotary axle of the holding element. For example, the arresting element may be configured to be transferred from its decoupled position into its arresting position by means of an anticlockwise rotation about the second rotary axle. In its arresting position, the arresting element is preferably configured to arrest the holding element in its holding position and/or its release position.

An arresting position that the arresting element assumes in order to arrest the holding element in its holding position may differ from an arresting position that the arresting element assumes in order to arrest the holding element in its release position. For example, in an arresting position in which it arrests the holding element in its release position, the arresting element may, relative to its decoupled position, be rotated a few degrees further anticlockwise about the second rotary axle than in an arresting position in which it arrests the holding element in its holding position.

In its decoupled position, the arresting element is preferably configured to permit a rotation of the holding element about the first rotary axle. When the arresting element is situated in its decoupled position, it is preferably not in contact with the holding element. Accordingly, the holding element can then be transferred from its holding position into its release position or from its release position into its holding position.

If the passenger door is situated in its raised position and the emergency slide is disarmed, the holding element is preferably, as described above, arranged in its holding position and arrested by means of the arresting element situated in its arresting position. During the lowering of the passenger door, the arresting element is preferably transferred from its arresting position into its decoupled position. As a result, a movement of the holding element from its holding position into its release position, and consequently a decoupling of the girt bar from the passenger door, are made possible. If the passenger door is raised in the armed state of the emergency slide, that is to say, in a state in which the girt bar is fixed to the fuselage portion and is locked in a decouplable manner to the engagement device, the arresting element is preferably moved from its decoupled position into its arresting position again. The arresting element then passes into engagement with the holding element again, and fixes the holding element in its release position. It is thereby ensured that the raising of the passenger door is not impeded by an interaction of the holding element with the girt bar.

The arresting element may, for example, similarly to the holding element, be designed in the form of a lever with lever arms extending from the second rotary axle. In the region of a first end, the arresting element preferably comprises a first arresting device which is configured to engage with a complementary second arresting device of the holding element in order to arrest the holding element in its holding position and/or its release position when the arresting element is situated in its arresting position. The second arresting device of the holding element may comprise a first and a second arresting projection which may extend from a surface, facing toward the arresting element, of the holding element. The first arresting device of the arresting element may then be in engagement selectively with the first or the second arresting projection of the second arresting device of the holding element in order to arrest the holding element selectively in its holding position or its release position.

The first arresting projection is preferably arranged further remote from the first rotary axle, and closer to the second end of the holding element, than the second arresting projection. Accordingly, the holding element is preferably rotated further anticlockwise about the first rotary axle when the first arresting device of the arresting element is in engagement with the second arresting projection than when the first arresting device of the arresting element is in engagement with the first arresting projection. Consequently, the holding element is preferably arrested in its holding position when the first arresting device of the arresting element engages under the first arresting projection. By contrast, the holding element is preferably arrested in its release position when the first arresting device of the arresting element engages under the second arresting projection.

Furthermore, the arresting element may be equipped, in the region of a second end, with a decoupling device which is configured to, during the lowering of the passenger door, abut against an abutment surface, which is formed on the engagement device, in order to rotate the arresting element about the second rotary axle from its arresting position into its decoupled position. In a preferred embodiment of the passenger door arrangement, the arresting element is preloaded into its arresting position, for example by means of a spring. By means of the interaction of the decoupling device with the abutment surface of the engagement device, the arresting element can then be rotated clockwise, counter to the spring-imparted preload force acting on the arresting element, about the second rotary axle in order to transfer the arresting element from its arresting position into its decoupled position.

The passenger door arrangement preferably furthermore comprises an activation device which is configured to activate the arming and disarming of the emergency slide. In particular, the activation device may be configured to trigger a movement of the holding element between its holding position and its release position. The activation device may, for example, comprise a manually actuatable selector lever which is provided in the region of an inner side of the passenger door and which is connected to the mechanism of the connecting arrangement and, in particular, to the holding element of the mechanism. For this purpose, the activation device may, for example, comprise a Bowden cable, the first end of which is connected to the selector lever and the second end of which is connected to the mechanism, in particular to the holding element.

An actuation of the selector lever is then converted into a corresponding movement of the holding element between its holding position and its release position. In particular, the holding element can be moved from its holding position into its release position by means of a corresponding actuation of the selector lever during the arming of the emergency slide. By contrast, during the disarming of the emergency slide, the holding element is preferably transferred from its release position into its holding position by means of a corresponding actuation of the selector lever.

The engagement device fastened to the fuselage portion may comprise a holding portion. The holding portion extends preferably substantially parallel to the passenger door and substantially perpendicular to the girt bar. Furthermore, the holding portion extends preferably substantially perpendicular to the abutment surface which is formed on the engagement device and against which the decoupling device of the arresting element abuts during the lowering of the passenger door. In the holding portion, there may be formed a receiving recess which is configured to receive the girt bar. Accordingly, the shape and the size of the receiving recess are preferably adapted to the shape and the size of the girt bar.

The locking mechanism of the engagement device preferably comprises a lock which is movable between an unlocking position and a locking position. When situated in its unlocking position, the lock is preferably configured to permit a decoupling of the girt bar from the engagement device. By contrast, in its locking position, the lock is configured to fix the girt bar to the engagement device. The lock may be designed, for example, in the form of a lock plate or in the form of a lock block.

The lock of the locking mechanism is preferably displaceable in a plane between its unlocking position and its locking position, which plane extends substantially parallel to a longitudinal axis of the girt bar. Furthermore, the plane in which the lock is displaceable between its unlocking position and its locking position may extend substantially perpendicular to the holding portion of the engagement device. When situated in its locking position, the lock is preferably configured to engage over the girt bar in order to fix the girt bar to the engagement device. In particular, the lock may, in its locking position, engage over the girt bar such that the girt bar is fixed in the receiving recess of the holding portion.

Furthermore, the locking mechanism may comprise a transmission mechanism which is connected to the lock and which is configured to, during the arming of the emergency slide, be actuated by the mechanism of the connecting arrangement in order to move the lock from its unlocking position into its locking position. The transmission mechanism is preferably designed so as to be actuatable by the first actuation portion of the holding element when the holding element is, during the arming of the emergency slide, rotated about the first rotary axle relative to the passenger door from its holding position into its release position. Accordingly, the transmission mechanism is preferably configured to be actuated by a pressure force which is exerted on the transmission mechanism by the first actuation portion of the holding element when the holding element, during the disarming of the emergency slide, is transferred from its holding position into its release position by means of an anticlockwise rotation about the first rotary axle.

Furthermore, the transmission mechanism is preferably configured to, during the disarming of the emergency slide, be actuated by the mechanism of the connecting arrangement in order to move the lock from its locking position into its unlocking position. The transmission mechanism is, in particular, designed so as to be actuatable by the second actuation portion of the holding element when the holding element is, during the disarming of the emergency slide, rotated about the first rotary axle relative to the passenger door from its release position into its holding position. Accordingly, the transmission mechanism is preferably configured to be actuated by a pressure force which is exerted on the transmission mechanism by the second actuation portion of the holding element when the holding element, during the disarming of the emergency slide, is transferred from its release position into its holding position by means of a clockwise rotation about the first rotary axle.

In a preferred variant, the transmission mechanism comprises a first actuation element which is rotatable about a third rotary axle relative to the engagement device between a non-actuated position and an actuated position. The first actuation element may, for example, be attached, rotatably about the third rotary axle, to the holding portion of the engagement device. The first actuation element is preferably configured to, during the aiming of the emergency slide, interact with the mechanism in order to be moved from its non-actuated position into its actuated position. In particular, the first actuation element is configured to be moved from its non-actuated position into its actuated position by a force, in particular a pressure force, which is exerted on the first actuation element by the first actuation portion of the holding element when the holding element, during the arming of the emergency slide, is transferred from its holding position into its release position by means of an anticlockwise rotation about the first rotary axle.

Furthermore, the transmission mechanism may comprise a second actuation element which is rotatable about at least one fourth rotary axle relative to the engagement device between a non-actuated position and an actuated position. The second actuation element may, for example, be designed in the form of a lever arm. A fourth rotary axle may be arranged in the region of a connecting end at which the second actuation element is connected, in particular, indirectly to the first actuation element. A further fourth rotary axle may form a central axle of the second actuation element and fix the second actuation element rotatably to the engagement device. The second actuation element is preferably configured to, during the disarming of the emergency slide, interact with the mechanism in order to be moved from its non-actuated position into its actuated position. In particular, the second actuation element is configured to be moved from its non-actuated position into its actuated position by a force, in particular a pressure force, which is exerted on the second actuation element, in particular a free end of the second actuation element, by the second actuation portion of the holding element when the holding element, during the disarming of the emergency slide, is transferred from its release position into its holding position by means of a clockwise rotation about the first rotary axle.

The transmission mechanism is preferably designed in the form of a crank-type transmission. The transmission mechanism can then be moved beyond a dead center during its actuation during the arming of the emergency slide, and then remains in the attained position without the need for a force having to be exerted on the transmission mechanism for this purpose. In particular, the transmission mechanism may be configured to be moved 15% beyond its dead center position during its actuation during the arming of the emergency slide. If desired or necessary, it is however also possible for an additional mechanical securing means to be provided which secures the transmission mechanism in its actuated position.

The transmission mechanism may comprise a first connecting element which, at a first end, is connected, rotatably about a fifth rotary axle, to the first actuation element and which, at a second end, is connected, rotatably about the fourth rotary axle, to the second actuation element. The first connecting element, which may be designed, for example, in the form of a lever, then serves for connecting the second actuation element to the first actuation element.

Furthermore, the transmission mechanism may comprise a second connecting element which, at a first end, is connected, rotatably about a sixth rotary axle, to the first actuation element and which, at a second end, is connected rotationally fixedly to the lock of the locking mechanism. The second connecting element serves for converting the movements of the first and of the second actuation element into a movement of the lock between its unlocking position and its locking position. The second connecting element may, for example, be preloaded by means of a spring into a position in which the second connecting element forces the lock into its unlocking position.

An aircraft segment comprises a door arrangement described above.

BRIEF DESCRIPTION OF THE DRAWINGS

A preferred embodiment of the door arrangement according to the invention is illustrated in the appended schematic drawings. In the drawings:

FIG. 1 shows a diagrammatic sketch of an aircraft segment which comprises a door arrangement equipped with an emergency slide kinematic system, wherein a passenger door of the door arrangement is situated in a raised position and an emergency slide is not armed;

FIGS. 2a-b show diagrammatic sketches of the aircraft segment as per FIG. 1, wherein the passenger door of the door arrangement is situated in a lowered position and the emergency slide is not armed;

FIG. 3 shows a diagrammatic sketch of the aircraft segment as per FIG. 1, wherein the passenger door of the door arrangement is situated in a lowered position and the emergency slide is armed; and FIG. 4 shows a diagrammatic sketch of the aircraft segment as per FIG. 1, wherein the passenger door of the door arrangement is situated in a raised position and the emergency slide is armed.

DETAILED DESCRIPTION OF THE PREFERRED EMBODIMENTS

In the description that follows, for the purposes of explanation but not limitation, specific details will be described in order to impart a basic understanding of the technology proposed here. It is self-evident to a person of average skill in the art that the present technology may also be realized in other exemplary embodiments which depart from these specific details.

FIGS. 1 to 4 each show an aircraft segment 1 equipped with a door arrangement 10, wherein the external shapes of the door arrangement 10 and of the aircraft segment 1 are merely schematically indicated. The door arrangement 10 comprises a passenger door 11, which is illustrated only in certain portions, and a fuselage portion 2 accommodating the passenger door 11. The passenger door 11 is movable relative to the fuselage portion 2, which may, for example, be designed in the form of a door frame equipped with a door opening, and which is likewise merely schematically indicated in the figures, between a raised position and a lowered position.

Furthermore, the door arrangement 10 comprises a girt bar 12 for arming and disarming an emergency slide 13. For this purpose, the girt bar 12 is connected, as main interface part, to the emergency slide 13, which is likewise merely schematically indicated in the figures. The girt bar 12 is connectable by means of a connecting arrangement 14 to the passenger door 11 and/or to the fuselage portion 2. The connecting arrangement 14 comprises both passenger-door-side components, that is to say, components assigned to the passenger door 11, and fuselage-portion-side components, that is to say, components assigned to the fuselage portion 2. The passenger-door-side components of the connecting arrangement 14 can be seen particularly clearly in an upper region of FIGS. 1 and 4. By contrast, the fuselage-portion-side components of the connecting arrangement 14 can be seen particularly clearly in a lower region of FIGS. 1 and 4.

The connecting arrangement 14 of the door arrangement 10 comprises a mechanism 16 which is assigned to the passenger-door-side components of the connecting arrangement 14 and which is configured to connect the girt bar 12 to the passenger door 11 in a disarmed state of the emergency slide 13 as illustrated in FIGS. 1, 2a and 2b. In the case of the emergency slide kinematic system illustrated in the figures, the mechanism 16 is fastened exclusively to the passenger door 11 and not to the fuselage portion 2, to a cabin floor or to some other element of the aircraft segment 1.

Furthermore, the connecting arrangement 14 comprises an engagement device 18 which is assigned to the fuselage-portion-side components of the connecting arrangement 14 and which is configured to connect the girt bar 12 to the fuselage portion 2 in an armed state of the emergency slide 13 as illustrated in FIGS. 3 and 4. In the case of the emergency slide kinematic system illustrated in the figures, the engagement device 18 is fastened exclusively to the fuselage portion 2 and not to the passenger door 11. The engagement device 18 comprises a locking mechanism 20, which is configured to fix the girt bar 12 to the engagement device 18 in a decouplable manner in the armed state of the emergency slide 13.

The locking mechanism 20 is actuated by the mechanism 16. In particular, the mechanism 16 is configured to actuate the locking mechanism 20 during the arming of the emergency slide 13 such that the locking mechanism 20 is activated and locked and the girt bar 12 is consequently fixed in a decouplable manner to the engagement device. It is thereby ensured that the girt bar 12 is fixed to the engagement device 18 and consequently to the fuselage portion 2 already during the arming of the emergency slide 13.

Furthermore, the mechanism 16 is configured to, during a disarming of the emergency slide 13, that is to say, during a transfer of the emergency slide 13 from its armed state into its disarmed state, actuate the locking mechanism 20 such that the locking mechanism 20 is unlocked. By means of the unlocking of the locking mechanism 20, the decoupling of the girt bar 12 from the engagement device 18 is possible, such that the girt bar 12 can be decoupled from the fuselage portion 2 and connected to the passenger door 11 again.

The connecting arrangement 14 is furthermore configured to, during the arming of the emergency slide 13, hold the girt bar 12 positionally fixed relative to the passenger door 11 situated in its lowered position. Accordingly, in the case of the door arrangement 10, it is the case that the position of the girt bar 12 relative to the passenger door 11 is not changed during the transition from disarming to arming of the emergency slide 13 in the lowered state of the passenger door 11.

The mechanism 16 assigned to the passenger-door-side components of the connecting arrangement 14 comprises a holding element 22 and an arresting element 24. The holding element 22 is fastened to the passenger door 11 so as to be rotatable about a first rotary axle D1 relative to the passenger door 11. By means of rotation about the rotary axle D1, the holding element 22 can be moved between a holding position, shown in FIGS. 1, 2a and 2b, and a release position, illustrated in FIGS. 3 and 4. In particular, as is clear from a comparison of FIGS. 1, 2a and 2b with FIGS. 3 and 4, the holding element 22 is transferred from its holding position into its release position by means of an anticlockwise rotation about the first rotary axle D1 during the arming of the emergency slide 13. Conversely, the holding element 22 is returned from its release position into its holding position by means of a clockwise rotation about the first rotary axle D1 during the disarming of the emergency slide 13.

The arming and disarming of the emergency slide 13 is activated by means of an activation device 26, which is merely schematically indicated in the figures. The activation device 26 comprises a manually actuatable selector lever, which is provided in the region of an inner side of the passenger door 11 but which is not illustrated in the figures, and a Bowden cable, which is likewise not shown in the figures. A first end of the Bowden cable is connected to the selector lever, whereas a second end of the Bowden cable is connected to the holding element 22. In this way, an actuation of the selector lever can be converted into a corresponding movement of the holding element 22.

In particular, during the arming of the emergency slide 13, the holding element 22 is moved from its holding position, shown in FIGS. 1, 2a and 2b, into its release position, illustrated in FIGS. 3 and 4, by means of a corresponding actuation of the selector lever which induces an anticlockwise rotation of the holding element 22 about the first rotary axle D1. By contrast, during the disarming of the emergency slide 13, the holding element 22 is transferred from its release position, illustrated in FIGS. 3 and 4, into its holding position, shown in FIGS. 1, 2a and 2b, by means of a corresponding actuation of the selector lever which induces a clockwise rotation of the holding element 22 about the first rotary axle D1.

In its holding position, the holding element 22 is configured to connect the girt bar 12 to the passenger door 11. For this purpose, the holding element 22, which in the variant of a door arrangement 10 shown in the figures, is designed in the form of a lever with lever arms extending from the first rotary axle D1, comprises a receiving portion 28 arranged in the region of a first end of the holding element 22. The receiving portion 28 is designed here in the form of a curved lever arm and engages under the girt bar 12 when the holding element 22 is situated in its holding position in the disarmed state of the emergency slide 13. In this way, the holding element 22, when arranged in its holding position in the disarmed state of the emergency slide, is in engagement with the girt bar 12 and securely fixes the girt bar 12 to the passenger door 11.

By contrast, the receiving portion 28 of the holding element 22 is positioned laterally offset in relation to the girt bar 12 with respect to a longitudinal axis L of the girt bar 12, and releases the girt bar 12 when the holding element 22, as shown in FIGS. 3 and 4, is situated in its release position in the armed state of the emergency slide 13. The girt bar 12 is then no longer fixed to the passenger door 11 by means of the holding element 22. Accordingly, the holding element 22 and the girt bar 12 disengage when the passenger door 11 is raised in the armed state, as illustrated in FIG. 4.

The arresting element 24 serves for arresting the holding element 22 selectively in its holding position or in its release position. In the embodiment of a door arrangement 10 shown in the figures, the arresting element 24 is fastened to the passenger door 11 adjacently with respect to the holding element 22 and is rotatable about a second rotary axle D2 relative to the passenger door 11 between a decoupled position, shown in FIGS. 2a, 2b and 3, and an arresting position, illustrated in FIGS. 1 and 4. The second rotary axle D2 of the arresting element 24 extends substantially parallel to the first rotary axle D1 of the holding element 22. By means of an anticlockwise rotation about the second rotary axle D2, the arresting element 24 is transferred from its decoupled position into its arresting position. By contrast, a clockwise rotation of the arresting element 24 about the second rotary axle D2 has the effect that the arresting element 24 is transferred from its arresting position into its decoupled position.

When the arresting element 24 is situated in its arresting position, it interacts with the holding element 22 such that a rotation of the holding element 22 about the first rotary axle D1 is prevented. In this way, the holding element 22 can be arrested selectively in its holding position or in its release position, see FIGS. 1 and 4. By contrast, when the arresting element 24 is situated in its decoupled position, it is not in contact with the holding element 22, such that the holding element 22 can rotate freely about the first rotary axle D1, see FIGS. 2a, 2b and 3. Accordingly, the holding element 22 can then be transferred from its holding position into its release position or from its release position into its holding position.

The arresting element 24 is designed in the form of a lever with lever arms extending from the second rotary axle D2. In the region of a first end, the arresting element 24 comprises a first arresting device 30. When the arresting element 24 is situated in its arresting position, the first arresting device 30, which may be formed, for example, by an end portion of a lever arm of the arresting element 24, is in engagement with a complementary second arresting device 32 of the holding element 22. In this way, the holding element 22 is arrested in its holding position and/or in its release position. The second arresting device 32 of the holding element 22 comprises a first and a second arresting projection 34, 36 which extend substantially parallel to one another from a surface, facing toward the arresting element 24, of the holding element 22. The first arresting projection 34 is arranged further remote from the first rotary axle D1, and closer to a second end of the holding element 22, than the second arresting projection 36.

By means of the interaction of the first arresting device 30 of the arresting element 24 with the first arresting projection 34 of the second arresting device 32 of the holding element 22, the holding element 22 is arrested in its holding position, as shown in FIG. 1. By contrast, by means of the interaction of the first arresting device 30 of the arresting element 24 with the second arresting projection 36 of the second arresting device 32 of the holding element 22, the holding element 22 is arrested in its release position, as shown in FIG. 4. Accordingly, the holding element 22 is rotated further anticlockwise about the first rotary axle D1 in its release position, when the first arresting device 30 of the arresting element 24 is in engagement with the second arresting projection 36 of the holding element 22, than in its holding position, when the first arresting device 30 of the arresting element 24 is in engagement with the first arresting projection 34 of the holding element 22.

It is thus also the case that the arresting position that the arresting element 24 assumes in order to arrest the holding element 22 in its holding position differs from the arresting position that the arresting element 24 assumes in order to arrest the holding element 22 in its release position. In particular, in the variant of a door arrangement 10 shown in the figures, in its arresting position in which it arrests the holding element 22 in its release position, as shown in FIG. 4, the arresting element 24 is, relative to its decoupled position illustrated in FIGS. 2a, 2b and 3, rotated a few degrees further anticlockwise about the second rotary axle D2 than in its arresting position in which it arrests the holding element 22 in its holding position, as shown in FIG. 1.

In the region of its second end, the arresting element 24 is equipped with a decoupling device 38 which, in the embodiment of a door arrangement 10 shown here, is designed in the form of a curved lever arm of the arresting element 24. The decoupling device 38 is configured to, during the lowering of the passenger door 11, abut against an abutment surface 40 formed on the engagement device 18. By means of the interaction of the decoupling device 38 of the arresting element 24 with the abutment surface 40 of the engagement device 18, the arresting element 24, which is preloaded into its arresting position by means of a spring 42, is rotated clockwise about the second rotary axle D2, and thus transferred from its arresting position into its decoupled position illustrated in FIGS. 2a, 2b and 3, counter to the force of the spring 42.

If the passenger door 11 is situated in its raised position as shown in FIG. 1 and the emergency slide 13 is disarmed, the holding element 22 is, as described above, arranged in its holding position and arrested by means of the arresting element 24 situated in its arresting position. During the lowering of the passenger door 11, the arresting element 24 is rotated clockwise about the second rotary axle D2, and thus transferred from its arresting position into its decoupled position, see FIGS. 2a, 2b and 3, by means of the interaction of the decoupling device 38 of the arresting element 24 with the abutment surface 40 of the engagement device 18. As a result, a movement of the holding element 22 from its holding position into its release position, and consequently a decoupling of the girt bar 12 from the passenger door 11, are made possible.

If, as shown in FIG. 4, the passenger door 11 is now raised in the armed state of the emergency slide 13, that is to say, in a state in which the girt bar 12 is fixed to the fuselage portion 2 and is locked in a decouplable manner to the engagement device 18, the decoupling device 38 of the arresting element 24 moves away from the abutment surface 40 of the engagement device 18, such that the arresting element 24 rotates anticlockwise about the second rotary axle D2 owing to the preload force of the spring 42, and thus moves back from its decoupled position into its arresting position again. Here, the first arresting device 30 of the arresting element 24 enters into engagement with the second arresting projection 36 of the second arresting device 32 of the holding element 22, such that the holding element 22 is fixed in its release position, see FIG. 4.

The engagement device 18 fastened to the fuselage portion comprises a base plate 44, which extends substantially parallel to a cabin floor (not illustrated in the figures) of the aircraft segment 1. The abutment surface 40, which is designed for interacting with the decoupling device 38, is formed by a part of a top side of the base plate 44. The base plate 44 is formed as a single piece with a holding portion 46, which extends substantially parallel to the passenger door 11 and substantially perpendicular to the girt bar 12 and to the base plate 44. In the holding portion 46, there is formed a receiving recess which receives the girt bar 12 when the passenger door 11 is situated in its lowered position, as shown in FIGS. 2a, 2b and 3, and when the passenger door 11 is raised in the armed state of the emergency slide 13, as illustrated in FIG. 4. The shape and the size of the receiving recess 48 are adapted to the shape and the size of the girt bar 12. In the case of the door arrangement 10 illustrated in the figures, the receiving recess is of U-shaped form and is thus suitable for receiving the girt bar 12, which has a substantially circular cross section.

The locking mechanism 20 of the engagement device 18 comprises a lock 50 which is designed in the form of a lock plate and which is movable between an unlocking position, shown in FIGS. 1, 2a and 2b, and a locking position, illustrated in FIGS. 3 and 4. In particular, the lock 50 is displaceable between its unlocking position and its locking position substantially perpendicularly with respect to the longitudinal axis L of the girt bar 12, in a plane which extends substantially parallel to the longitudinal axis L of the girt bar 12 and the base plate 44 and substantially perpendicular to the holding portion 46 of the engagement device 18. The displacement movement of the lock 50 is guided by a groove 51 which is formed in the holding portion 46 of the engagement device 18.

When situated in its unlocking position, the lock is arranged laterally offset in relation to the girt bar 12 with respect to the longitudinal axis L of the girt bar 12 and thus permits a decoupling of the girt bar 12 from the engagement device 18, that is to say, a removal of the girt bar 12 from the receiving recess 48 formed in the holding portion 46. By contrast, in its locking position, the lock 50 engages over the girt bar 12 and thus fixes the girt bar 12 to the engagement device 18, that is to say, the lock prevents a removal of the girt bar 12 from the receiving recess 48 formed in the holding portion 46.

Furthermore, the locking mechanism 20 comprises a transmission mechanism 52 which is connected to the lock 50 and which is configured to, during the arming of the emergency slide 13, be actuated by the mechanism 16 of the connecting arrangement 14 in order to move the lock 50 from its unlocking position into its locking position. The transmission mechanism 52, which is designed here in the form of a crank-type transmission, comprises a first actuation element 54, which is rotatable about a third rotary axle D3 relative to the engagement device 18 between a non-actuated position, shown in FIGS. 1, 2a and 2b, and an actuated position, illustrated in FIGS. 3 and 4. In particular, the first actuation element 54 is attached, rotatably about the third rotary axle D3, to the holding portion 46 of the engagement device 18. The first actuation element 54 is configured to, during the arming of the emergency slide 13, interact with the mechanism 16 in order to be moved from its non-actuated position into its actuated position.

Furthermore, the transmission mechanism 52 comprises a second actuation element 56, which is rotatable about two fourth rotary axles D4a and D4b relative to the engagement device 18 between a non-actuated position, shown in FIGS. 3 and 4, and an actuated position, illustrated in FIGS. 1, 2a and 2b. The second actuation element 56 is designed here in the form of a lever arm and is connected by means of a first connecting element 58 to the first actuation element 54. In particular, the first connecting element 58 is at a first end connected, rotatably about a fifth rotary axle D5, to the first actuation element 54 and which at a second end is connected, rotatably about the first fourth rotary axle D4a, to the second actuation element 56. Furthermore, the second actuation element 56 is fastened, rotatably about the second fourth rotary axle D4b, which forms a central axis of the second actuation element 56, to the engagement device 18, that is to say, to the holding portion 46 of the engagement device 18. A free end of the second actuation element 56 projects through an opening 59 which is formed in the base plate 44 of the engagement device 18. The second actuation element 56 is configured to, during the disarming of the emergency slide 13, interact with the mechanism 16 in order to be moved from its non-actuated position into its actuated position.

Finally, the transmission mechanism 52 comprises a second connecting element 60 which at a first end is connected, rotatably about a sixth rotary axle D6, to the first actuation element 54 and which at a second end is connected rotationally fixedly to the lock 50 of the locking mechanism 20. The second connecting element 60 serves for converting the movements of the first and of the second actuation element 54, 56 into a displacement of the lock 50 between its unlocking position and its locking position, and is preloaded by means of a spring 62 into a position in which the second connecting element 60 pulls the lock 50 into its unlocking position.

When the passenger door 11 is situated in its raised position, as shown in FIG. 1, and the emergency slide 13 is disarmed, the first actuation element 54 of the transmission mechanism 52 is situated in its non-actuated position, in which the first actuation element 54 projects upwards beyond the holding portion 46 of the engagement device 18. By contrast, the second actuation element 56 of the transmission mechanism 52 is situated in its actuated position, in which the second actuation element 56 extends, substantially perpendicularly with respect to the longitudinal axis L of the girt bar 12, through the opening 59 formed in the base plate 44 of the engagement device 18.

When the passenger door 11 is lowered, the receiving portion 28 of the holding element 22 is also received in the opening 59 in the base plate 44 of the engagement device 18, see FIGS. 2a and 2b. In the disarmed state of the emergency slide 13 as shown in FIGS. 2a and 2b, the operating state of the locking mechanism 20 is however still unchanged. It is merely the case that the arresting element 24 is, already as a result of the lowering of the passenger door 11, transferred from its arresting position into its decoupled position, whereby, as described above, a movement of the holding element 22 from its holding position into its release position is made possible.

If the arming of the emergency slide 13 is now activated by means of the activation device 26, the holding element 22 is rotated anticlockwise about the first rotary axle D1 into its release position, see FIG. 3. Here, a first actuation portion 64, which is arranged in the region of a second end of the holding element 22, abuts against the first actuation element 54 of the transmission mechanism 52. In particular, the first actuation portion 64, which extends from a surface, facing toward the locking mechanism 20, of the holding element 22, exerts a pressure force on the first actuation element 54, as a result of which the first actuation element 54 is moved from its non-actuated position into its actuated position shown in FIGS. 3 and 4.

The movement of the first actuation element 54 from its non-actuated position into its actuated position induces a movement of the second connecting element 60 relative to the first actuation element 54 and relative to the base plate 44 and the holding portion 46 of the engagement device 18. Whereas bottom sides, facing towards the base plate 44 of the engagement device 18, of the first actuation element 54 and of the second connecting element 60 form an angle <90° in the non-actuated state of the first actuation element 54, the bottom sides, facing towards the base plate 44, of the first actuation element 54 and of the second connecting element form an angle >180° in the actuated state of the first actuation element 54.

As a result, the lock 50, which is attached rotationally fixedly to the second connecting element 60, is displaced from its unlocking position into its locking position, in which it engages over the girt bar received in the receiving recess 48. The first actuation portion 64 of the holding element 22 is consequently configured to actuate the locking mechanism 20, that is to say, the transmission mechanism 52 of the locking mechanism 20, such that the girt bar 12 is fixed in a decouplable manner to the engagement device 18 by the lock 50 when the holding element 22 is rotated about the first rotary axle D1 relative to the passenger door 11 from its holding position into its release position during the arming of the emergency slide 13.

During its actuation during the arming of the emergency slide 13, the transmission mechanism 52 designed in the form of a crank-type transmission is moved beyond a dead center and then remains in the attained position without the need for a force to be exerted on the transmission mechanism 52 for this purpose. If desired or necessary, the transmission mechanism 52 may, however, also be equipped with an additional mechanical securing means which secures the transmission mechanism 52 in the operating state illustrated in FIGS. 3 and 4.

If, finally, the passenger door 11 is raised in the armed state of the emergency slide 13, as shown in FIG. 4, the girt bar 12 remains fixed to the engagement device 18, and consequently to the fuselage portion 2, by means of the lock 50 of the locking mechanism 20. The emergency slide 13 can deploy, and is securely held on the fuselage portion 2 by means of the interaction of the girt bar 12 with the locking mechanism 20. By contrast, those components 22, 24 of the mechanism 16 which are fastened to the passenger door 11 decouple from the girt bar 12 and from the engagement device 18 during the raising of the passenger door 11. As soon as the decoupling device 38 of the arresting element 24 is raised from the abutment surface 40 formed on the base plate 44, the arresting element 24 rotates anticlockwise about the second rotary axle D2 owing to the preload force of the spring 42, until the first arresting device 30 of the arresting element 24 engages with detent action, as described above, with the second arresting projection 36 of the second arresting device 32 of the holding element 22, and thus arrests the holding element 22 in its release position.

By contrast, if it is the intention for the armed state of the emergency slide 13, as illustrated in FIG. 3, to be eliminated and for the emergency slide 13 to be disarmed, the activation device 26 is activated again. In the event of an activation of the activation device 26 for the purposes of disarming the emergency slide 13, the manual actuation of the selector lever, however, induces a rotation of the holding element 22 clockwise about the first rotary axle D1 from its release position shown in FIG. 3 into its holding position. Here, a second actuation portion 66, which is arranged in the region of the first end of the holding element 22 and which is, in particular, formed by an end portion of the receiving portion 28 of the holding element 22, interacts with the second actuation element 56 of the transmission mechanism 52. In particular, the second actuation portion 66 exerts a pressure force on the second actuation element 56, as a result of which the second actuation element 56 is moved from its non-actuated position into its actuated position shown in FIGS. 1, 2a and 2b.

By means of the actuation of the second actuation portion 66, the transmission mechanism 52 is moved back beyond its dead center again, until the other components of the transmission mechanism 52 also again assume the positions shown in FIGS. 1, 2a and 2b. By means of the force of the spring 62, the lock 50 is then also pushed back into its unlocking position again. If the passenger door 11 is now raised, the girt bar 12 is driven along by the receiving portion 28 of the holding element 22 and is thus securely fixed to the passenger door 11 again. Furthermore, the arresting element 24 rotates anticlockwise about the second rotary axle D2 owing to the preload force of the spring 42, until the first arresting device 30 of the arresting element 24 engages with detent action, as described above, with the first arresting projection 34 of the second arresting device 32 of the holding element 22, and thus arrests the holding element 22 in its release position, as soon as the decoupling device 38 of the arresting element 24 is raised from the abutment surface 40 formed on the base plate 44. The transmission mechanism 52 is consequently configured to, during the disarming of the emergency slide 13, be actuated by the mechanism 16 of the connecting arrangement 14, that is to say, the second actuation portion 66 of the holding element 22, in order to move the lock 50 from its locking position into its unlocking position.

The door arrangement 10 described here is advantageous in particular with regard to at least one of the following points:
  The girt bar is fixed to the engagement device already immediately during the aiming of the emergency slide. An additional locking step that first takes place during the activation of the emergency slide is thus avoided.
  The connecting arrangement has a small number of individual components and therefore a low weight.
  During the arming of the emergency slide, the girt bar remains in its position in relation to emergency slide, door and fuselage portion.
  Relatively low complexity of the connecting arrangement, with a positive effect on production and assembly times.
  Robust interface between door, girt bar and fuselage portion with regard to handling and tolerance effects.
  Shorter production and maintenance times/interruptions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door arrangement for an aircraft segment, comprising:
  a passenger door,
  a fuselage portion accommodating the passenger door, wherein the passenger door is movable relative to the fuselage portion between a raised position and a lowered position, and
  a girt bar configured to arm and disarm an emergency slide, the girt bar being connectable via a connecting arrangement to at least one of the passenger door or the fuselage portion,
  wherein the connecting arrangement comprises a mechanism which is configured to, during arming of the emergency slide, actuate a locking mechanism of an engagement device fastened to the fuselage portion, such that the girt bar is fixed in a decouplable manner to the engagement device,
  wherein the mechanism comprises a holding element which is fastened to the passenger door and which is rotatable about a first rotary axle relative to the passenger door between a holding position and a release position, wherein the holding element is configured, in the holding position, to connect the girt bar to the passenger door and is configured, in the release position, to release the girt bar, and wherein the holding element comprises a lever having a receiving portion which is arranged in a region of a first end of the lever and which is configured to receive the girt bar, and hold the latter in the position relative to the passenger door, when the holding element is situated in the holding position in a disarmed state of the emergency slide, and a first acutation portion which is arranged in the region of a second end of the lever and which is configured to actuate the locking mechanism of the engagement device such that the girt bar is fixed in a decouplable manner to the engagement device when the holding element is rotated about the first rotary axle relative to the passenger door from the holding position into the release position during the arming of the emergency slide, wherein the first rotary axle is located between the first end of the lever and the second end of the lever.

2. The door arrangement according to claim 1, wherein at least one of:

the mechanism of the connecting arrangement is configured to connect the girt bar to the passenger door in a disarmed state of the emergency slide, or the engagement device of the connecting arrangement is configured to connect the girt bar to the fuselage portion in an armed state of the emergency slide.

3. The door arrangement according to claim 1, wherein the mechanism of the connecting arrangement is furthermore configured to, during disarming of the emergency slide, actuate the locking mechanism of the engagement device fastened to the fuselage portion, in such a way that the locking mechanism is unlocked.

4. The door arrangement according to claim 1, wherein the connecting arrangement is configured to, during the arming of the emergency slide, hold the girt bar positionally fixed relative to the passenger door situated in the lowered position.

5. The door arrangement according to claim 1, wherein the receiving portion of the holding element comprises a second actuation portion which is configured to actuate the locking mechanism of the engagement device such that the locking mechanism is unlocked when the holding element is rotated about the first rotary axle relative to the passenger door from the release position into the holding position during the disarming of the emergency slide.

6. The door arrangement according to claim 1, which furthermore comprises:

an activation device which is configured to activate the arming and disarming of the emergency slide, wherein the activation device is configured to trigger a movement of the holding element between the holding position and the release position.

7. The door arrangement according to claim 1, wherein the engagement device comprises a holding portion in which a receiving recess is formed, wherein the receiving recess is configured to receive the girt bar.

8. The door arrangement according to claim 1,
wherein the mechanism comprises an arresting element which is fastened to the passenger door and which is rotatable about a second rotary axle relative to the passenger door between at least one arresting position and a decoupled position, wherein the arresting element is configured, in the arresting position, to arrest the holding element in at least one of the holding position or the release position and is configured, in the decoupled position, to permit a rotation of the holding element about the first rotary axle.

9. The door arrangement according to claim 8, wherein the arresting element comprises at least one of:

a first arresting device which is arranged in the region of a first end of the arresting element and which is configured to engage with a complementary second arresting device of the holding element to arrest the holding element in at least one of the holding position or the release position when the arresting element is situated in the arresting position, or a decoupling device which is arranged in the region of a second end of the arresting element and which is configured to, during the lowering of the passenger door, abut against an abutment surface, which is formed on the engagement device, to rotate the arresting element about the second rotary axle from the arresting position into the decoupled position.

10. The door arrangement according to claim 1, wherein the locking mechanism of the engagement device comprises:

a lock which is movable between an unlocking position and a locking position, wherein the lock is configured, in the unlocking position, to permit a decoupling of the girt bar from the engagement device, and is configured, in the locking position, to fix the girt bar to the engagement device, and a transmission mechanism which is connected to the lock and which is configured to, during at least one of the arming or the disarming of the emergency slide, be actuated by the mechanism in order to move the lock at least one of from the unlocking position into the locking position or from the locking position into the unlocking position.

11. The door arrangement according to claim 10, wherein the transmission mechanism comprises at least one of:

a first actuation element, which is rotatable about a third rotary axle relative to the engagement device between a non-actuated position and an actuated position and which is configured to, during the arming of the emergency slide, interact with the mechanism in order to be moved from the non-actuated position into the actuated position, or a second actuation element, which is rotatable about at least one fourth rotary axle relative to the engagement device between a non-actuated position and an actuated position and which is configured to, during the disarming of the emergency slide, interact with the mechanism in order to be moved from the non-actuated position into the actuated position.

12. The door arrangement according to claim 11, wherein the transmission mechanism is configured as a crank-type transmission and furthermore comprises at least one of:

a first connecting element which at a first end is connected, rotatably about a fifth rotary axle, to the first actuation element and which at a second end is connected, rotatably about the fourth rotary axle, to the second actuation element, or a second connecting element which at a first end is connected, rotatably about a sixth rotary axle, to the first actuation element and which at a second end is connected rotationally fixedly to the lock of the locking mechanism.

13. An aircraft segment which comprises a door arrangement according to claim 1.

\* \* \* \* \*